United States Patent [19]

Fisher

[11] Patent Number: 4,678,295
[45] Date of Patent: Jul. 7, 1987

[54] MEMORY POSITIONING SYSTEM FOR REMOTE CONTROL REAR-VIEW MIRROR

[75] Inventor: Robert J. Fisher, Livonia, Mich.

[73] Assignee: Magna International Inc, Downsview, Canada

[21] Appl. No.: 720,363

[22] Filed: Apr. 5, 1985

[51] Int. Cl.[4] .............................. B60R 1/06; G02B 7/18
[52] U.S. Cl. .................................... 350/634; 248/481; 248/487; 350/636; 350/637
[58] Field of Search ............................ 350/631–637; 248/466, 476, 479, 481–487

[56] References Cited

U.S. PATENT DOCUMENTS

| | | | |
|---|---|---|---|
| 3,549,243 | 12/1970 | Horwitt et al. | 350/637 |
| 3,609,014 | 9/1971 | Kurz, Jr. | 350/634 |
| 3,917,212 | 11/1975 | Hadley et al. | 248/487 |
| 3,972,597 | 8/1976 | Repay et al. | 350/634 |
| 4,003,271 | 1/1977 | Stelma | 248/481 X |
| 4,056,253 | 11/1977 | Repay et al. | 248/479 |
| 4,076,392 | 2/1978 | Suzuki et al. | 248/487 X |
| 4,324,454 | 4/1982 | Kumai | 350/634 |
| 4,474,428 | 10/1984 | Wunsch et al. | 350/637 |
| 4,477,874 | 10/1984 | Ikuta et al. | 364/424 |
| 4,482,211 | 11/1984 | Fisher | 350/637 |
| 4,502,759 | 3/1985 | Herzog et al. | 350/636 |

FOREIGN PATENT DOCUMENTS

0094856  11/1983  European Pat. Off. .
2840789   4/1980  Fed. Rep. of Germany .

*Primary Examiner*—John Petrakes
*Attorney, Agent, or Firm*—Cushman, Darby & Cushman

[57] ABSTRACT

A memory positioning system for use in a remote control rear-view mirror having electric motors for adjusting the mirror's position, which position is electrically detected by linear potentiometers connected to a microprocessor that records the potentiometer-generated signals. After the signals corresponding to a preselected position have been recorded and the mirror adjusted to a different position, the mirror can be returned to the pre-selected position by commanding the microprocessor to operate the motors until the potentiometers detect the previously recorded positions corresponding to the recorded signals. A rib and slot on the mirror's main spherical pivot mounting provide only a limited predetermined amount of vibration-absorbing pivotal movement about an axis which intersects the plane of the mirror. The mirror also has stops which permit only a limited amount of pivotal movement about the same axis.

18 Claims, 10 Drawing Figures

MEMORY POSITIONING SYSTEM FOR REMOTE CONTROL REAR-VIEW MIRROR

BACKGROUND AND SUMMARY OF INVENTION

Various means have been devised to electrically adjust vehicle mirrors. Generally one or more electric motors are connected to a mirror casing for independently pivoting the casing about a horizontal axis and a vertical axis. Illustrations of various adjusting means are found in U.S. Pat. Nos. 3,609,014, 3,972,597, 4,056,253, 4,324,454, German Pat. No. 2,840,789, and European patent application No. EP 0094856.

The mirror casing of an electrically adjustable mirror is generally mounted to a base by either a ball and socket or cross-shaft type mount which permit free pivotal movement about the horizontal and vertical axes. However, in these types of mounts little attention is given to pivotal movement about a third axis which is mutually perpendicular to the horizontal and vertical axes. Additional illustrations of mounting means are found in U.S. Pat. Nos. 3,549,243 and 3,917,212.

It is important to control the amount of pivotal movement of the mirror case about the third axis, that is, an axis substantially parallel to the longitudinal axis of the vehicle. Excessive freedom of movement about the third axis causes unacceptable vibration of the image and interferes with proper adjustment and control of mirror position. Conversely, vibration problems are also created by mounting the mirror casing to the base member such that pivotal movement about the third axis is completely prevented. Since the mirror casing is generally mounted upon an arm which extends to the side of the vehicle, road or engine-induced vibrations caused by the vehicle tend to be magnified at the mirror casing. Thus, both insufficient and excessive freedom of mirror movement about the third axis are undesirable.

It is therefore an object of this invention to provide an improved means for mounting the mirror casing to the base member which avoids the aforementioned problems. In this regard, a mounting means is provided that allows a predetermined limited amount of pivotal movement about the third axis. This limited movement is just enough to prevent any vision impairing vibrations from occurring in the mirror casing, but is not enough to require the mirror to be adjusted about the third axis. The mounting means comprises a slotted ball which is pivotally received in a spherical socket having a pair of longitudinal ribs which engage the slots in the ball.

As with all vehicle mirrors, it is usually necessary to adjust mirror position for a different driver or when the driver changes the seat position. This problem occurs, for example, when an operator adjusts the mirror for himself and it is thereafter adjusted by a second operator. When the first operator wants to operate the vehicle again he must readjust the mirrors. Typically, the mirrors of a family car may frequently be re-adjusted between two alternate positions each time the driver changes.

It is therefore another object of this invention to provide an automatic return means for a vehicle mirror, whereby the mirror will automatically return to one of two or more pre-set positions without the need for the usual trial and error adjustment technique. It is desirable that the adjustment of the mirror be extremely accurate, otherwise further adjustment would be required. It is also desirable to have a reliable system which is not prone to defects, but which is readily repairable if defects do occur.

An automatic return means for an adjustable mirror has been previously attempted. The automatic return means involved a string attached to the underside of a mirror casing. The string was wrapped around a rotary drum potentiometer and a pulley. When the glass case was pivoted to a new position the rotary drum potentiometer would create a position-responsive electrical signal due to the string's travel.

The rotary drum potentiometer and pulley system had several drawbacks, including insufficient accuracy or repeatability to eliminate the need for adjustment, and breakage and loosening problems with the string and pulley system. See also U.S. Pat. No. 4,477,874.

The present invention overcomes these drawbacks by using a pair of linear potentiometers. Each linear potentiometer comprises a shaft or elongated member with one end pivotally connected to the movable mirror casing and with the opposite end being free to reciprocate in the fixed mirror base. The member carries an electrical contact which reciprocates along a conductor in response to mirror movement. This reciprocal action forms a linear potentiometer which creates an electrical signal which is distinct for each horizontal and vertical position of the mirror.

By using a microprocessor the signal generated by the linear potentiometer at a pre-set mirror position can be recorded. When the mirror is to be adjusted to a prior recorded position the microprocessor is activated. The microprocessor energizes the electric motors which pivot the mirror until the linear potentiometer generates a signal equal to the recorded signal corresponding to the pre-set mirror position. When the recorded signal is sensed the microprocessor stops the motor means.

The linear potentiometers of this invention provide the high degree of accuracy and durability required for a memory positioned mirror.

DETAILED DESCRIPTION OF THE INVENTION

Figure 1:
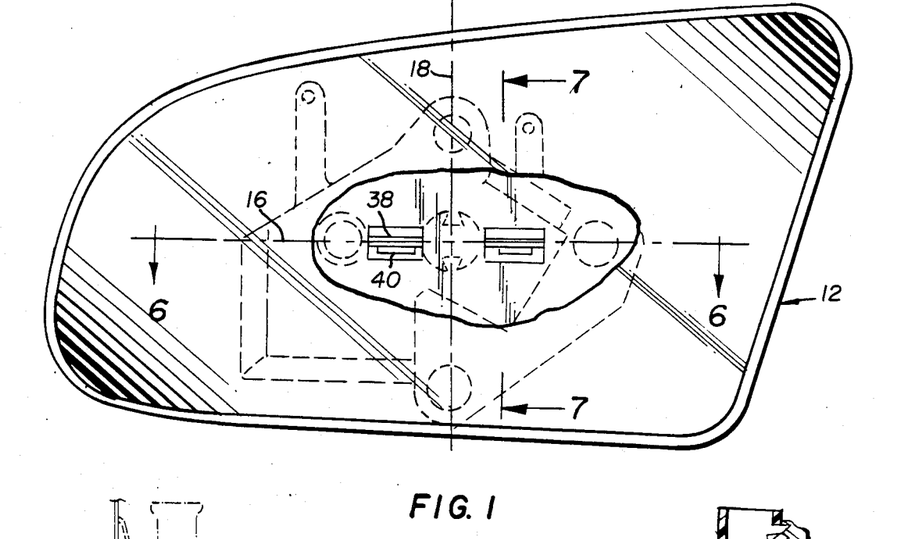
FIG. 1 is a front view, partially broken away, of the mirror case.
Figures 2, 3:
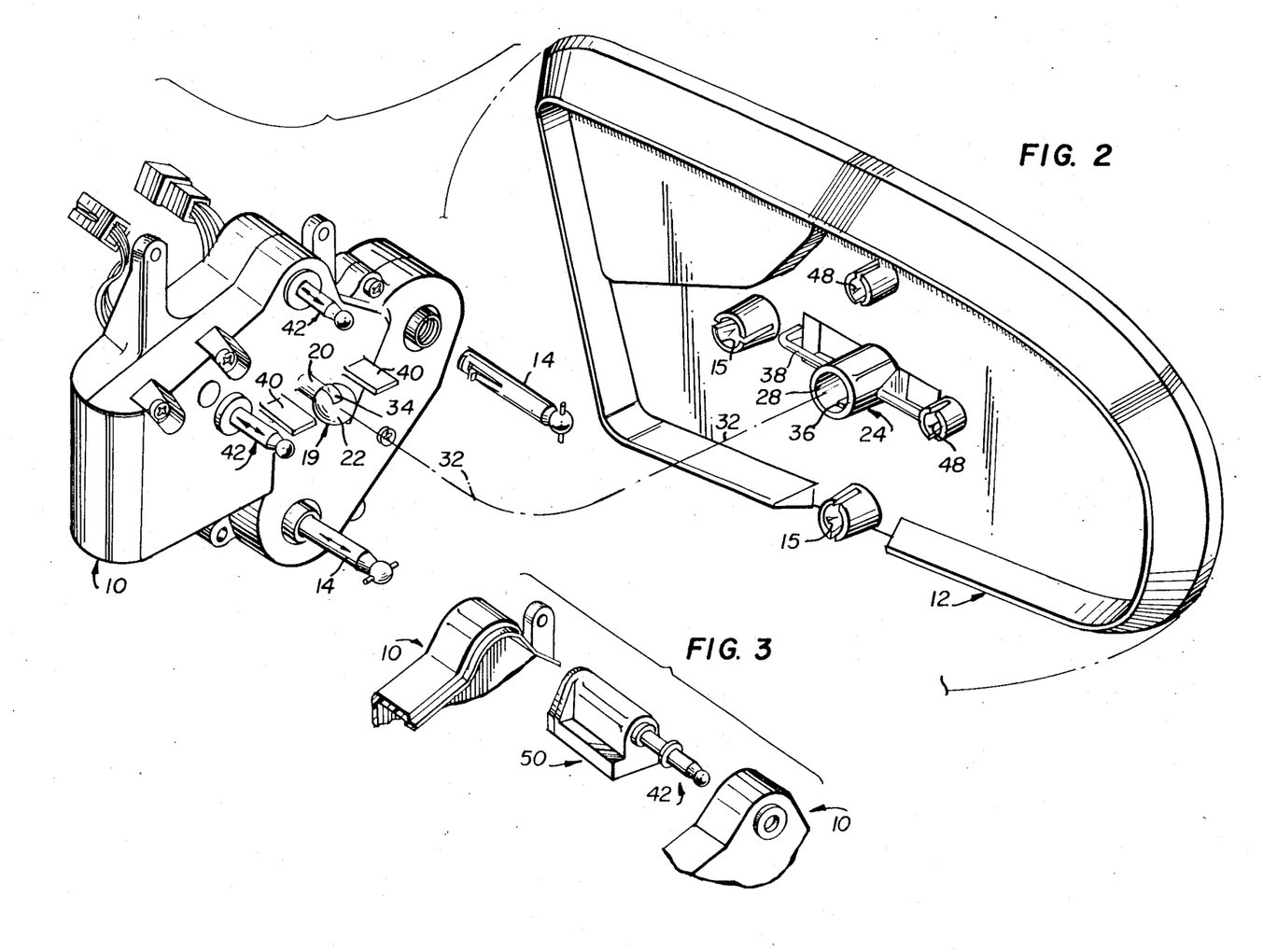
FIG. 2 is an exploded perspective view of the rear face of the mirror case and the opposing face of the base housing.
FIG. 3 is a perspective view of the potentiometer and fragments of the base housing.
Figure 6:
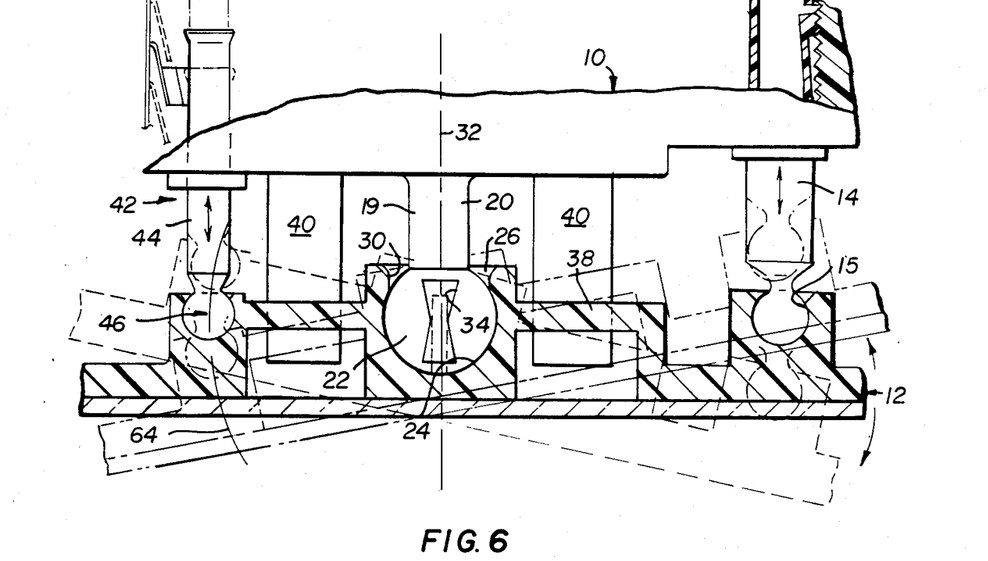
FIG. 6 is a top view, partly in section and fragmented of a portion of the base housing and three positions of the mirror case, viewed in the direction of arrows 6—6 of FIG. 1.

Referring to FIGS. 1, 2 and 6, there is illustrated an electrically operated adjustable mirror having a fixed base member 10 and a mirror case 12. The mirror case 12 has a mirror (unillustrated) mounted to one face and is pivotally connected on its opposite face to the base member 10. The details of the connection will be discussed in more detail below.

The position of the mirror is adjusted about the base member 10 by a pair of adjustment shafts 14 which are pivotally received in sockets 15 protruding from the mirror case 12. Electric motor and gear means within member 10 operate to reciprocate adjustment shafts 14, and this reciprocal action pushes and pulls the mirror case 12 about the horizontal axis 16 and the vertical axis 18. A more detailed description of the adjustment shafts, motor means and gearing means may be found in applicant's U.S. Pat. No. 4,482,211, the disclosure of which is hereby incorporated by reference.

The mirror case 12 is pivotally mounted to the base member 10 by a mounting means 19 comprising an elongated member 20 which extends outwardly from the base member 10 and has a sphere 22 affixed at its upper end.

A sphere-receiving socket 24 extends outwardly from the mirror case 12, and has an opening 26 which leads into an interior spherical chamber 28 which is substantially the same size as the sphere 22. The opening 26 is slightly smaller in diameter than the sphere 22. The slightly smaller diameter of the opening 26 creates a retaining lip 30 which retains the sphere within socket 24.

The mirror 12 is connected to the base member 10 by forcibly inserting the sphere 22 into the opening 26. The resilient yieldability of the plastic socket wall permits such insertion and subsequent retention. Optionally, the yieldability may be increased by forming the socket wall in circumferentially spaced segments. After the sphere 22 has been inserted, the mirror case 12 is free to pivot about the sphere 22 without being disconnected from the base member 10.

As previously explained, the position of mirror case 12 is readily adjustable about the first and second pivotal axes 16 and 18. However, it is desirable to limit pivotal movement about a third axis 32 (see FIG. 2). Only a slight predetermined amount of pivotal movement about axis 32 is desired, to allow the mirror to dampen vibrations created about the roll axis of the vehicle. This slight pivoting frees the mirror from being rigid with the car which prevents the mirror from reaching a resonant frequency. This limited freedom about third axis 32 provides stability without interfering with adjustment about the horizontal and vertical axes.

Figure 9:
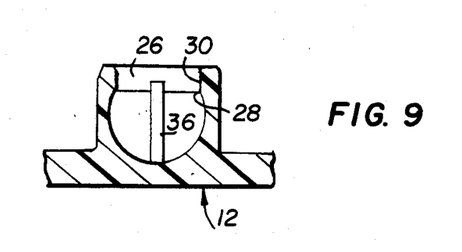
FIG. 9 is an enlarged cross-sectional view off the mounting socket.

To control the amount of pivotal movement about the third axis 32, the following two means may be used separately or in combination. It is preferred by the applicant to use both means in combination. The first means involves the location of two diametrically opposed grooves 34 on the sphere 22 which engage two splines 36 on the inside of socket 24. See FIGS. 8 and 9. The grooves 34 are flared at their ends to permit free pivotal action about the horizontal axis 16 and vertical axis 18 but are narrowed at their mid-point to prevent excessive pivoting about the third axis 32. The predetermined amount of pivotal movement about the third axes 32 is achieved by making the width of the splines 36 slightly less than the width of the groove 34 at its mid-point. An exemplary spacing which achieves the desired damping is 0.002" on each side of each spline 36 with a socket diameter of 0.420".

The second movement limiting means involves the use of a rollbar means 38 and stop means 40, as best shown in FIGS. 1, 2, 6 and 7. The rollbar means 38 is located on the mirror case 12 and comprises two elongated members extending outwardly from socket 24 in a direction perpendicular to the third axis 32 and parallel to the horizontal axis 16. The stop means 40, which for example may be paddle or peg shaped, extend outwardly from the base member 10 and are positioned a slight distance above or below and parallel to the horizontal axis 16 and on both sides of the mounting means 19. The roll bar means 38 may be on the base member 10 and the stop means 40 on the mirror case 12.

When the mirror case 12 is connected to the base member 10 the rollbar 38 is a slight predetermined distance, for example 0.010 of an inch, above or below stop means 40, allowing limited pivotal movement about the third axis 32. The majority of the torsional vibrations of the vehicle to which the mirror is subjected are damped by the sphere 22 and socket 24 arrangement. The rollbar 38 and stop 40 arrangement is operable to engage just prior to when the splines and grooves engage so as to absorb peak loads such as when the vehicle wheel on the mirror side hits a pot hole. Shock absorbtion is achieved by deflection of the stop bars 40.

The automatic adjustment means or "memory" feature will now be described. Protruding outwardly from the base member 10 are the linear potentiometers 42, each comprising a shaft portion 44 and sphere portion 46 (see FIGS. 2 and 6). The spheres 46 are received within potentiometer receiving sockets 48 protruding from the mirror case 12. The sphere 46 must be forceably inserted into the receiving socket 48.

Figure 4:
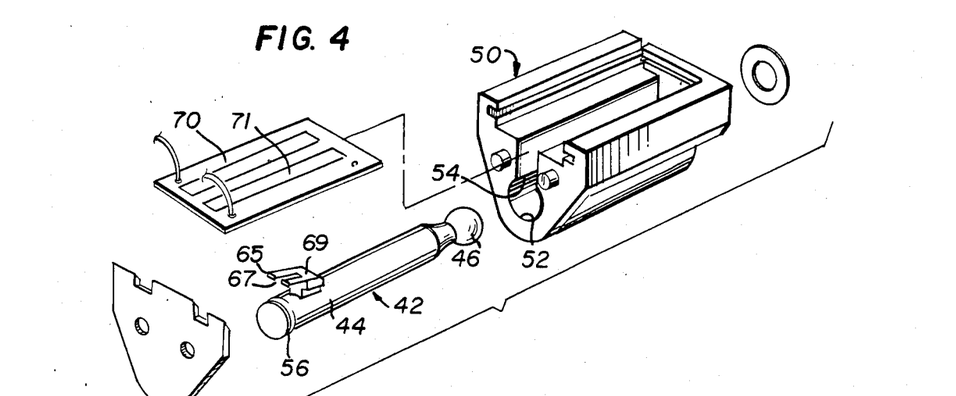
FIG. 4 is an exploded perspective view of the potentiometer.
Figures 5, 7, 8:
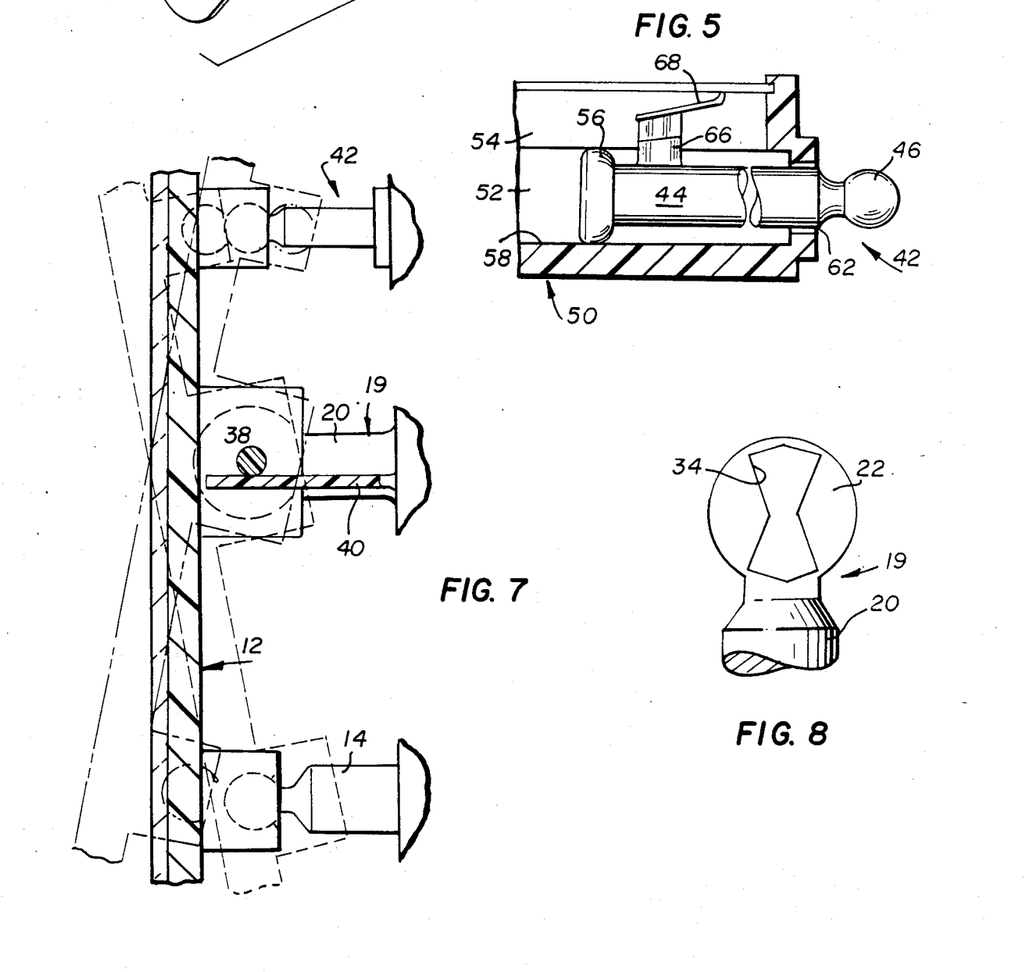
FIG. 5 is a cross-sectional elevation of the potentiometer.
FIG. 7 is an enlarged cross-sectional elevation of the mirror case, shown in three positions, viewed in the direction of arrows of 7—7 of FIG. 1.
FIG. 8 is an enlarged view of the outer end of the main mounting ball.

This sphere-socket connection causes potentiometer shaft 44 to reciprocate within a housing 50 as a result of the pivotal movement of the mirror case 12 about the base member 10. As shown in FIGS. 4 and 5, the housing 50 has an elongated bore 52 which is smooth to provide a surface on which the potentiometer shaft 44 can travel. An elongated opening or slot 54 is located in one side of bore 52.

A guide means 56 is formed as a frustrum of a sphere at the end of the potentiometer shaft 44 opposite the sphere 46. Guide means 56 extends about the periphery of the potentiometer shaft 44 and has a cross sectional diameter slightly greater than that of shaft 44, permitting only the guide means to contact the interior walls 58 of the elongated bore 52. The guide means 56 has a convex outer surface to allow the potentiometer shaft 44 to readily rock within bore 52. Also, to provide clearance for the rocking action a gap 62 is provided between the housing 50 and potentiometer shaft 44.

The ability of the potentiometer shaft 44 to rock within the elongated bore 52 is of critical importance to this invention. If the shaft 44 did not rock within the bore 52 the mirror could not pivot. As the mirror case 12 is pivoted about the base member 10 the sphere portion 46 of shaft 44 is moved in a arcuate path 64 as shown in FIG. 6. This arcuate path causes the distance of potentiometer sphere 46 from the third pivotal axis 32 to continually change as the mirror moves. The potentiometer sphere 46 will be a maximum distance from the third pivotal axis 32 when the mirror case 12 is perpendicular to axis 32. The sphere will be a minimum distance from axis 32 when the mirror case 10 is either fully pivoted outwardly or fully pivoted inwardly with respect to the base member 10.

To minimize the overall lateral movement of the potentiometer sphere 46 and correspondingly the potentiometer shaft 44, the center line of the elongated bore 52 is initially positioned a distance from the third pivotal axis 32 which is between the maximum and minimum distances of the sphere from axis 32. Positioning the center line of the elongated bore 52 in this manner will reduce the required size of the gap 62 and reduce the extent of the resulting misalignment of shaft 44 within bore 52 as sphere 46 moves laterally with swinging socket 48.

For the industry accepted adjustment range of 22 degrees along arcuate path 64, the applicant has found it advantageous to place the center line of the elongated bore 52, 0.875 inches from the center line of the third pivotal axis 32. With these dimensions, the centerline of the sphere 46 is placed a distance 0.882 inches from the center line of the third pivotal axis 32 when the mirror case 12 is parallel to the base member 10. When the mirror case 12 is pivoted to its outermost or innermost position with respect to base member 10 the potentiometer sphere 46 is 0.868 inches from the third pivotal axis 32. By locating the bore center line or axis midway between the two extreme positions of sphere 46, only 0.007 inch deflection from such axis occurs. Stated differently, the distance between the bore center line and the third pivotal axis is generally equal to the average of the maximum and minimum perpendicular distances of the sphere 46 center point from the third pivotal axis 32.

Figure 10:
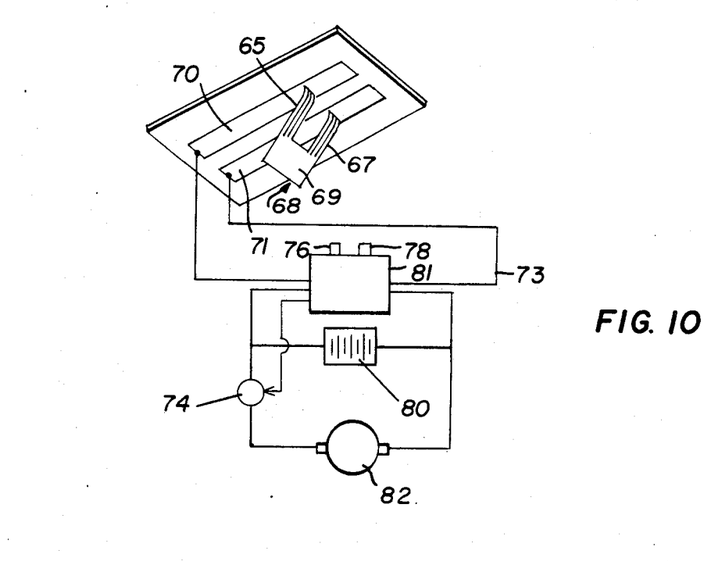
FIG. 10 is a schematic view of the potentiometer circuit.

Referring now to FIGS. 4, 5 and 10, the linear potentiometer will be more fully described. The linear potentiometer shaft 44 has a tab member 66 extending outwardly therefrom and through the elongated opening 54 in the wall 58 of the elongated bore 52. Attached to the end of the tab 66 is a brush or wiper contact 68. The brush has two sides 65, 67 connected by a cross piece 69. Sides 65 and 67 contact a pair of spaced, parallel and stationary elongated electrically conductive resistance elements 70 and 71, respectively.

The conductive element 70 is connected to a voltage source 80 such as the vehicle battery. As potentiometer shaft 44 reciprocates within housing 50 the brush 68 moves along both conducting surfaces 70 and 71. This movement creates a variable electrical resistance on element 70 which generates an electrical signal proportionally responsive to the position of said mirror casing 12. This signal is carried by side 65 across member 69 to side 67 where it is received by the conductive element 71. A wire 73 attached to conductive element 71 carries the signal to a microprocessor 81.

In operation, the vehicle operator adjusts the mirror casing to a desired position by using the manual switches 74 to actuate motors 82 (only one of each is shown) and adjustment shafts 14. The adjustment of the mirror case 12 generates an electrical signal across the linear potentiometer which is then received by the microprocessor 81. Once the desired adjustment is obtained the operator pushes a set button 76, whereupon the microprocessor records the signal received.

If the position of the mirror case 12 is thereafter changed all the vehicle operator has to do to return the mirror case 12 to the original position selected is to press the actuator button 78. The microprocessor then starts the motors 82 which operate the actuators 14 to reposition the mirror. The motors continue to run as the linear potentiometers 42 sense the signal changes across element 70. The signal changes are continually received by the microprocessor 81 through element 71 and wire 73. The microprocessor compares the received signals with the recorded signal. When the linear potentiometers 42 reach the position having the identical signal as the recorded signal, the microprocessor immediately stops the motors 82. The mirror case 12 is now readjusted to the desired pre-set position.

It has been found that by using the linear potentiometer the mirror is readjustable to within 1/1000th of an inch of its previous position. It should be apparent to one of ordinary skill in the art that the microprocessor can store more than one signal (each signal representing one associated pre-set mirror position), one signal being used only for illustrative purposes.

The mirror case 12 is easily removable from the base member by pulling each of the spheres out of the resiliently yieldable sockets in the mirror case. Therefore, repair of the electrically adjustable mirror is greatly simplified over those which are presently in use.

It will be apparent to those skilled in the art that the foregoing disclosure is explanatory in nature rather than limiting, the invention being limited only by the appended claims.

What is claimed is:

1. In a vehicle mirror of the type including a base, a mirror casing, means for mounting said mirror casing relative to said base for pivotal movement about first and second mutually perpendicular intersecting axes between limiting positions and against substantial movement about a third intersecting axis which is mutually perpendicular to said first and second axes, sensing means for sensing the position of pivotal movement of said mirror casing with respect to said base about said first and second axes, and automatic return means including electric motor means operable in response to said sensing means for moving said mirror casing with respect to said base about said first and second axes from any position thereof into a selected position previously sensed by said sensing means, the improvement which comprises said sensing means including first and second elongated mirror position sensing members each having first and second ends, means for pivotally connecting the first end of said first sensing member to said mirror casing at a first effective point of connection lying on the second of said intersecting axes, means for mounting the second end of said first sensing member on said base for reciprocation therein along a first parallel axis spaced a first fixed distance in substantially parallel relation with said third axis in such a way as to accomodate the movement of the first effective point of connection of the first end thereof along an arcuate path of variable perpendicular distance from said third axis as the mirror casing is pivoted between said limiting positions about the first of said intersecting axes, means for pivotally connecting the first end of said second sensing member to said mirror casing at a second effective point of connection lying on the first of said intersecting axes, means for mounting the second end of said second sensing member on said base for reciprocation therein along a second parallel axis spaced a second fixed distance in substantially parallel relation with said third axis in such a way as to accomodate the movement of the second effective point of connection of the first end thereof along an arcuate path of variable perpendicular distance from said third axis as said mirror casing is pivoted between said limiting positions about the second of said intersecting axes, said first and second effective points of connection each being a maximum perpendicular distance away from said third intersecting axis when at a position substantially midway between its limiting positions and being a minimum perpendicular distance away from said third intersecting axis when at its limiting positions, said first and second distances each being generally equal to the average of the maximum and minimum perpendicular distances associated therewith.

2. The improvement as defined in claim 1 wherein said mounting means for the first end of each of said first and second sensing members comprises a spherical formation on the first end of the associated sensing member and a socket formation on said mirror casing matingly receiving said spherical formation.

3. The improvement as defined in claim 1 wherein said mounting means for the second end of each of said first and second sensing members comprises a bore in said base concentric with the associated parallel axis, the second end of the associated sensing member having an enlarged exterior partial ball-shaped surface slidably and turnably engaged within said bore.

4. The improvement as defined in claim 3 wherein said electric motor means includes first and second electric motors, said automatic return means further including a first motion transmitting mechanism connected in driven relation with said first electric motor and in motion transmitting relation between said base and said mirror casing at a third effective point of connection with the latter lying on the second of said intersecting axes at a position on the opposite side of the intersection thereof as said first point of connection, and a second motion transmitting mechanism connected in driven relation with said second electric motor and in motion transmitting relation between said base and said mirror casing at a fourth effective point of connection with the latter lying on the first of said intersecting axes at a position on the opposite side of the intersection thereof as said second point of connection.

5. The improvement as defined in claim 4 wherein said sensing means further includes a first linear potentiometer operatively associated with said first sensing member for generating an electrical signal indicative of the position of the mirror casing sensed by said first sensing member and a second linear potentiometor operatively associated with said second sensing member for establishing an electrical signal indicative of the position of the mirror casing sensed by said second sensing member, said automatic return means further including a microprocessor electrically connected to said first and second linear potentiometers and to said first and second electric motors, said microprocessor being capable, upon manually applied storage command, of storing the electrical signals generated by said first and second linear potentiometers for at least one selected position of said mirror casing, and of causing said mirror casing to be selectively returned to said one selected position at which said storage command was applied by starting said first and second motors and causing the same to continue to run and move said mirror case until the signals generated by said first and second linear potentiometers are equal to said storage signals, whereupon said microprocessor then stops said first and second motors.

6. The improvement as defined in claim 5 wherein said first and second linear potentiometers each comprises a movable electric contact fixed to the second end of the associated sensing member for reciprocating movement therewith within an elongated slot communicating with the associated bore and a stationary electrically conductive resistance element extending longitudinally along said slot in a position to be slidably contacted by said movable electric contact.

7. The improvement as defined in claim 3 wherein said sensing means further includes a first linear potentiometer operatively associated with said first sensing member for generating an electrical signal indicative of the position of the mirror casing sensed by said first sensing member and a second linear potentiometor operatively associated with said second sensing member for establishing an electrical signal indicative of the position of the mirror casing sensed by said second sensing member, said automatic return means further including a microprocessor electrically connected to said first and second linear potentiometers and to said first and second electric motors, said microprocessor being capable, upon manually applied storage command, of storing the electrical signals generated by said first and second linear potentiometers for at least one selected position of said mirror casing, and of causing said mirror casing to be selectively returned to said one selected position at which said storage command was applied by starting said first and second motors and causing the same to continue to run and move said mirror case until the signals generated by said first and second linear potentiometers are equal to said storage signals, whereupon said microprocessor then stops said first and second motors.

8. The improvement as defined in claim 7 wherein said first and second linear potentiometers each comprises a movable electric contact fixed to the second end of the associated sensing member for reciprocating movement therewith within an elongated slot communicating with the associated bore and a stationary electrically conductive resistance element extending longitudinally along said slot in a position to be slidably contacted by said movable electric contact.

9. The improvement as defined in claim 1 wherein said electric motor means includes first and second electric motors, said automatic return means further including a first motion transmitting mechanism connected in driven relation with said first electric motor and in motion transmitting relation between said base and said mirror casing at a third effective point of connection with the latter lying on the second of said intersecting axes at a position on the opposite side of the intersection thereof as said first point of connection, and a second motion transmitting mechanism connected in driven relation with said second electric motor and in motion transmitting relation between said base and said mirror casing at a fourth effective point of connection with the latter lying on the first of said intersecting axes at a position on the opposite side of the intersection thereof as said second point of connection.

10. The improvement as defined in claim 1 wherein said means for mounting said mirror casing on said base comprises a spherical socket formed on one of said mirror casing and said base and a spherical mounting element formed on the other of said mirror casing and said base, said spherical socket having an opening on one side and being shaped and dimensioned so that said socket opening may resiliently expand for insertion of said spherical mounting element in a direction parallel to said third axis so that said spherical socket may snugly grip and surround said spherical mounting element while permitting relative pivotal movement therebetween about said first and second axes, said socket having a pair of diametrically opposed ribs extending parallel to the direction of insertion of said spherical mounting element into said socket and projecting inwardly into the socket cavity, said spherical mounting element having a pair of diametrically opposed slots extending parallel to said direction of insertion, the width of each of said slots being a minimum at substantially the mid-point along the length of each slot and the slot width flaring outwardly from said midpoint toward the opposite ends of each slot, said minimum width being dimensioned to freely but snugly receive said socket ribs to thereby essentially prevent any substantial degree of rotation of said mirror casing about said third axis, and said flared ends of said slots permitting pivotal adjustments of said mirror casing about said first and second axes.

11. The improvement as defined in claim 10 wherein first and second abutment means are located on said mirror casing and said base, respectively, said first and second abutment means being located at a greater distance from said third axis than are said ribs and said slots and being positioned to abut each other only after a predetermined limited amount of rotation of said mirror casing about said third axis to thereby prevent further rotation of said mirror casing about said third axis, which amount of rotation is selected to avoid objectionable vibration-induced rotation of said mirror casing about said third axis.

12. In a vehicle mirror of the type including a base, a mirror casing, and means for mounting said mirror casing relative to said base for pivotal movement about first and second mutually perpendicular intersecting axes between limiting positions and against substantial movement about a third intersecting axis which is mutually perpendicular to said first and second axes, the improvement which comprises said mounting means comprising:
  a spherical socket formed on one of said mirror casing and said base and a spherical mounting element formed on the other of said mirror casing and said base, said spherical socket having an uninterrupted edge defining an opening on one side and being shaped and dimensioned so that said socket opening may resiliently expand for insertion of said spherical mounting element in a direction parallel to said third axis so that said spherical socket may snugly grip and surround said spherical mounting element while permitting relative pivotal movement therebetween about said first and second axes,
  said socket having a pair of diametrically opposed ribs extending parallel to the direction of insertion of said spherical mounting element into said socket and projecting inwardly into the socket cavity,
  said spherical mounting element having a pair of diametrically opposed slots extending parallel to said direction of insertion, the width of each of said slots being a minimum at substantially the midpoint along the length of each slot and the slot width flaring outwardly from said midpoint toward the opposite ends of each slot, said minimum width being dimensioned to freely but snugly receive said socket ribs to thereby essentially prevent any substantial degree of rotation of said mirror casing about said third axis, and said flared ends of said slots permitting pivotal adjustments of said mirror casing about said first and second axes.

13. The improvement as defined in claim 12 wherein first and second abutment means are located on said mirror casing and said base, respectively, said first and second abutment means being located at a greater distance from said third axis than are said ribs and said slots and being positioned to abut each other only after a predetermined limited amount of rotation of said mirror casing about said third axis to thereby prevent further rotation of said mirror casing about said third axis, which amount of rotation is selected to avoid objectionable vibration-induced rotation of said mirror casing about said third axis.

14. In a vehicle mirror of the type including a base, a mirror casing, means for mounting said mirror casing relative to said base for pivotal movement about first and second mutually perpendicular intersecting axes between limiting positions and against substantial movement about a third intersecting axis which is mutually perpendicular to said first and second axes, sensing means for sensing the position of pivotal movement of said mirror casing with respect to said base about said first and second axes, and automatic return means including electric motor means operable in response to said sensing means for moving said mirror casing with respect to said base about said first and second axes from any position thereof into a selected position previously sensed by said sensing means, the improvement which comprises
  said sensing means including first and second elongated mirror position sensing members each having first and second ends,
  means for pivotally connecting the first end of said first sensing member to said mirror casing at a first effective point of connection lying on the second of said intersecting axes,
  means for mounting the second end of said first sensing member on said base for reciprocation therein along a first parallel axis spaced a first fixed distance in substantially parallel relation with said third axis in such a way as to accomodate the movement of the first effective point of connection of the first end thereof along an arcuate path of variable perpendicular distance from said third axis as the mirror casing is pivoted between said limiting positions about the first of said intersecting axes,
  means for pivotally connecting the first end of said second sensing member to said mirror casing at a second effective point of connection lying on the first of said intersecting axes,
  means for mounting the second end of said second sensing member on said base for reciprocation therein along a second parallel axis spaced a second fixed distance in substantially parallel relation with said third axis in such a way as to accomodate the movement of the second effective point of connection of the first end thereof along an arcuate path of variable perpendicular distance from said third axis as said mirror casing is pivoted between said limiting positions about the second of said intersecting axes, said mounting means for the second end of each of said first and second sensing members comprising a bore in said base concentric with the associated parallel axis, the second end of the associated sensing member having an enlarged exterior partial ball-shaped surface slidably and turnably engaged within said bore.

15. The improvement as defined in claim 14 wherein said sensing means further includes a first linear potentiometer operatively associated with said first sensing member for generating an electrical signal indicative of the position of the mirror casing sensed by said first sensing member and a second linear potentiometor operatively associated with said second sensing member for establishing an electrical signal indicative of the position of the mirror casing sensed by said second sensing member, said automatic return means further including a microprocessor electrically connected to said first and second linear potentiometers and to said first and second electric motors, said microprocessor being capable, upon manually applied storage command, of storing the electrical signals generated by said first and second linear potentiometers for at least one selected position of said mirror casing, and of causing said mirror casing to be selectively returned to said one selected position at which said storage command was applied by starting said first and second motors and causing the same to continue to run and move said mirror case until the signals generated by said first and second linear potentiometers are equal to said storage signals, whereupon said microprocessor then stops said first and second motors.

16. The inprovement as defined in claim 15 wherein said first and second linear potentiometers each comprises a movable electric contact fixed to the second end of the associated sensing member for reciprocating movement therewith within an elongated slot communicating with the associated bore and a stationary electrically conductive resistance element extending longitudinally along said slot in a position to be slidably contacted by said movable electric contact.

17. The improvement as defined in claim 16 wherein said electric motor means includes first and second electric motors, said automatic return means further including a first motion transmitting mechanism connected in driven relation with said first electric motor and in motion transmitting relation between said base and said mirror casing at a third effective point of connection with the latter lying on the second of said intersecting axes at a position on the opposite side of the intersection thereof as said first point of connection, and a second motion transmitting mechanism connected in driven relation with said second electric motor and in motion transmitting relation between said base and said mirror casing at a fourth effective point of connection with the latter lying on the first of said intersecting axes at a position on the opposite side of the intersection thereof as said second point of connection.

18. The improvement as defined in claim 14 wherein said electric motor means includes first and second electric motors, said automatic return means further including a first motion transmitting mechanism connected in driven relation with said first electric motor and in motion transmitting relation between said base and said mirror casing at a third effective point of connection with the latter lying on the second of said intersecting axes at a position on the opposite side of the intersection thereof as said first point of connection, and a second motion transmitting mechanism connected in driven relation with said second electric motor and in motion transmitting relation between said base and said mirror casing at a fourth effective point of connection with the latter lying on the first of said intersecting axes at a position on the opposite side of the intersection thereof as said second point of connection.

* * * * *